(12) United States Patent
Kawasumi

(10) Patent No.: US 9,921,462 B2
(45) Date of Patent: Mar. 20, 2018

(54) LIGHT SOURCE OPTICAL SYSTEM AND PROJECTION DISPLAY APPARATUS EMPLOYING THE SAME

(71) Applicant: CANON KABUSHIKI KAISHA, Tokyo (JP)

(72) Inventor: Takehito Kawasumi, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/356,265

(22) Filed: Nov. 18, 2016

(65) Prior Publication Data
US 2017/0153538 A1 Jun. 1, 2017

(30) Foreign Application Priority Data
Nov. 28, 2015 (JP) .................. 2015-232534

(51) Int. Cl.
G03B 21/20 (2006.01)
G02B 3/00 (2006.01)
H04N 9/31 (2006.01)
G02B 27/14 (2006.01)
G02B 27/10 (2006.01)

(52) U.S. Cl.
CPC .......... *G03B 21/208* (2013.01); *G02B 27/10* (2013.01); *G02B 27/141* (2013.01); *G03B 21/204* (2013.01); *G03B 21/2013* (2013.01); *G03B 21/2066* (2013.01); *G02B 3/0056* (2013.01); *H04N 9/3152* (2013.01)

(58) Field of Classification Search
CPC .............. G03B 21/204; G03B 21/208; G03B 21/2013; G03B 21/2066; G02B 27/10; G02B 27/1006; G02B 3/0056; G02B 27/141; H04N 9/3152; H04N 9/3164
USPC ................... 353/38; 359/621, 622
See application file for complete search history.

(56) References Cited

U.S. PATENT DOCUMENTS

| | | |
|---|---|---|
| 2011/0234998 A1 | 9/2011 | Kurosaki |
| 2012/0133904 A1 | 5/2012 | Akiyama |
| 2013/0250253 A1 | 9/2013 | Ogura |
| 2013/0322056 A1 | 12/2013 | Konuma et al. |
| 2014/0022512 A1 | 1/2014 | Li et al. |
| 2014/0168614 A1 | 6/2014 | Matsubara et al. |
| 2015/0222864 A1 | 8/2015 | Inoko |
| 2016/0370696 A1* | 12/2016 | Akiyama ........... G03B 21/2066 |

FOREIGN PATENT DOCUMENTS

| | | |
|---|---|---|
| DE | 10-2014-202090 A1 | 8/2015 |
| EP | 2650593 A1 | 10/2013 |
| EP | 2757414 A2 | 7/2014 |
| JP | 2015-135436 A | 7/2015 |

* cited by examiner

*Primary Examiner* — Ryan Howard
(74) *Attorney, Agent, or Firm* — Canon USA Inc., IP Division

(57) ABSTRACT

A light source optical system includes a micro lens array, a condenser lens unit, and a dichroic surface. In a direction orthogonal to an optical axis in a cross section parallel to a normal of the dichroic surface and the optical axis of the condenser lens unit, a width of the dichroic surface is narrower than a width of the condenser lens unit. A light source optical system satisfies a predetermined conditional expression.

10 Claims, 9 Drawing Sheets

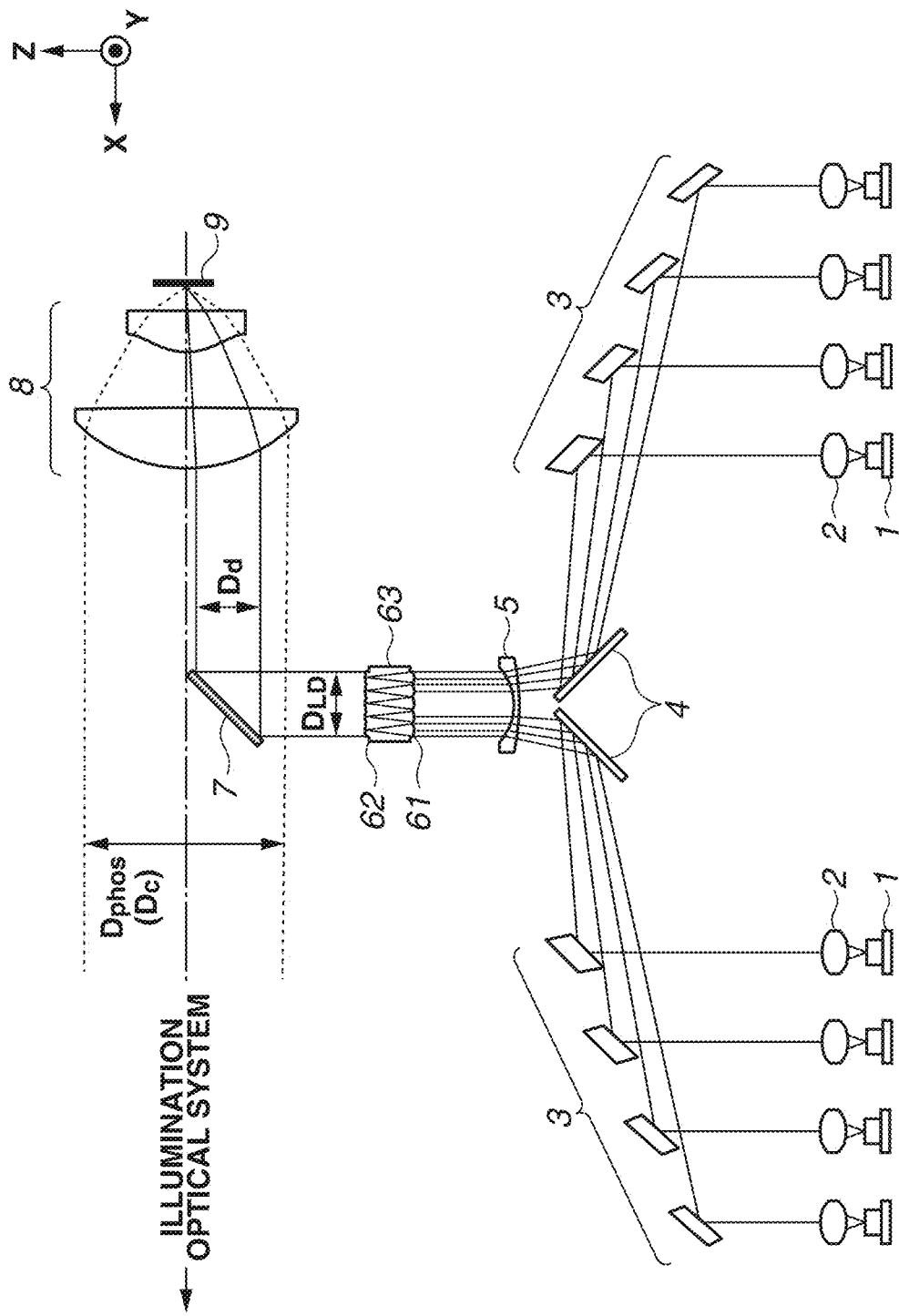

FIG.2A
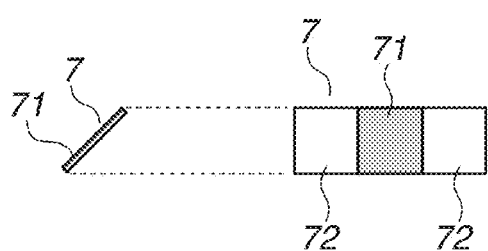
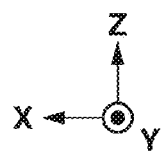
FIG.2B
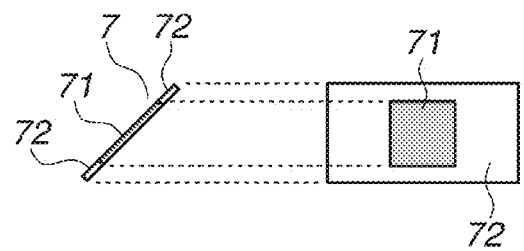
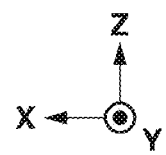

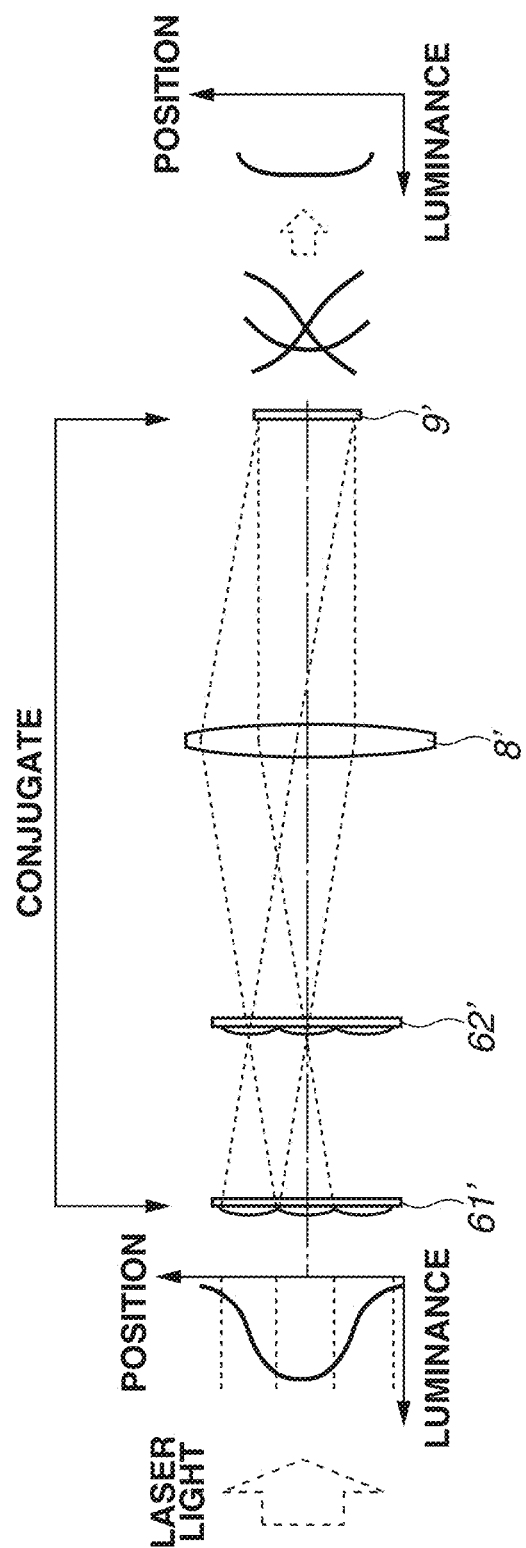

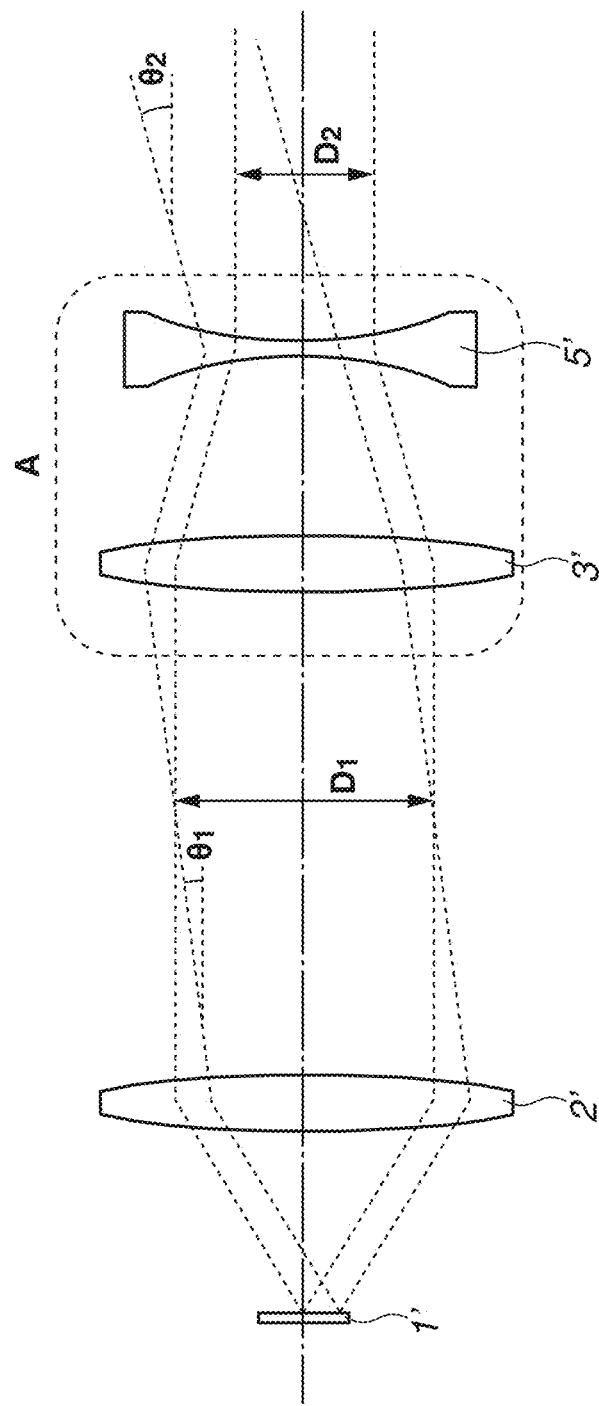

LIGHT SOURCE OPTICAL SYSTEM AND PROJECTION DISPLAY APPARATUS EMPLOYING THE SAME

BACKGROUND OF THE INVENTION

Field of the Invention

The present invention relates to a light source optical system and a projection display apparatus employing the same.

Description of the Related Art

In recent years, a projector has been developed that irradiates a fluorescent body with a light flux emitted from high output laser diodes (hereinafter referred to LDs) as an excitation light, and includes a wavelength-converted fluorescent light as a light source light. In such a projector, the brightness of the projector can be increased by increasing the number of LDs and/or increasing the output of each LD.

However, the light density of a light source spot formed on a fluorescent body surface is increased when the strength of incident light onto the fluorescent body is increased to increase the brightness. As a result, a problem such as reduction of the light conversion efficiency occurs because of a luminance saturation phenomenon, and therefore, the brightness proportional to the increase in the output of the LD cannot be obtained.

A technique discussed in United States Patent Application Publication No. 2012/0133904 is known as a technique to solve such a problem. United States Patent Application Publication No. 2012/0133904 discusses a configuration in which two fly-eye lenses are provided on the latter stage of an optical system for compressing light fluxes from a plurality of LDs. Such a configuration can uniformize the light density of the light source spot formed on the fluorescent body and suppress the occurrence of an area having an extremely high light density to suppress the reduction of the light conversion efficiency described above.

The configuration discussed in United States Patent Application Publication No. 2012/0133904 requires not only the LD for exciting the fluorescent body but also an LD for guiding a blue color light to a color separating and combining system and an optical system therearound, leading to increasing the entire apparatus size.

SUMMARY OF THE INVENTION

Accordingly, the present invention is directed to a technique for achieving a smaller light source optical system capable of suppressing the reduction in the light conversion efficiency of the wavelength conversion element and a projection display apparatus employing the same.

A light source optical system configured to guide a light flux from a light source to a wavelength conversion element includes a first lens surface array including a plurality of first lens surfaces, a second lens surface array including a plurality of second lens surfaces and configured to receive a light flux from the first lens surface array, a condense optical system having a positive power configured to guide a light flux from the second lens surface array to the wavelength conversion element, and a light guide surface configured to guide the light flux from the second lens surface array to the wavelength conversion element via the condense optical system, In a direction perpendicular to an optical axis of the condense optical system in a cross section parallel to a normal of the light guide surface and including the optical axis of the condense optical system, a width of the light guide surface is narrower than a width of the condense optical system, and the following expression is satisfied:

$$0.25 < N \cdot S_{LA} \cdot \frac{S_{LA}}{f_{LA}^2} \ [\text{mm}^2]$$

where the number of the second lens surfaces is defined as N, a focal length of the second lens surface is defined as $f_{LA}$, and an area of the second lens surface is defined as $S_{LA}$.

Further features of the present invention will become apparent from the following description of exemplary embodiments with reference to the attached drawings.

BRIEF DESCRIPTION OF THE DRAWINGS

FIG. 1 is a diagram illustrating a configuration of a light source apparatus according to a first exemplary embodiment of the present invention.

FIGS. 2A and 2B are diagrams each illustrating a configuration of a dichroic mirror.

FIG. 3 is a diagram illustrating uniformization of a laser light flux by a lens array.

FIG. 6 is a diagram illustrating a change in an angle variation of a light flux caused by the light flux passing through an afocal system.

DESCRIPTION OF THE EMBODIMENTS

Figure 4A:
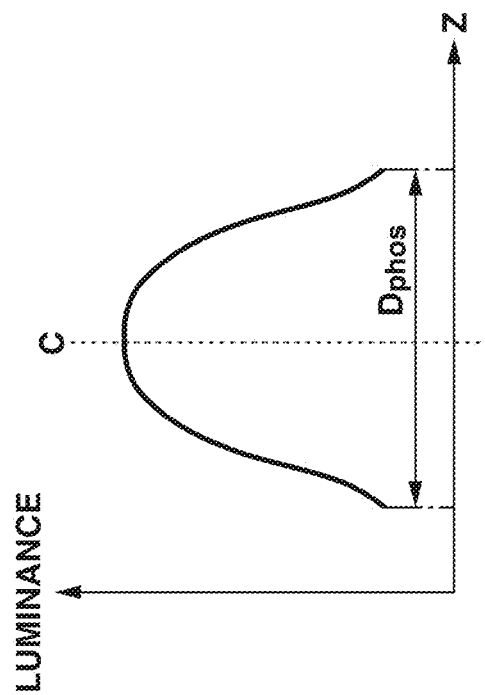
FIGS. 4A and 4B are graphs each illustrating a definition of a light flux diameter.

Exemplary embodiments of the present invention will be described below with reference to the drawings. However, relative arrangements and the like of constituent components described in the exemplary embodiments may be changed as necessary according to the configurations and various conditions of the apparatus to which this invention is to be applied. More specifically, the present invention is not limited to the exemplary embodiments described below, and various modifications and changes can be made within the scope of the gist of the present invention.

Hereinafter, a first exemplary embodiment of the present invention will be described in detail with reference to the accompanying drawings.

(Configuration of Light Source Optical System and Light Source Apparatus)

FIG. 1 is a diagram illustrating a configuration of a light source apparatus as the first exemplary embodiment according to the present invention. In FIG. 1, a direction parallel to an optical axis of a condenser lens unit 8 described below is defined as an X axis direction, a direction in which a surface parallel to the X axis direction and to the normal of a dichroic mirror 7 (described below) is an XZ cross section is defined as a Z axis direction, and a direction perpendicular to the X axis direction and the Z axis direction is defined as a Y axis direction. Accordingly, FIG. 1 is a diagram of the XZ cross section as indicated by the coordinate axes illustrated therein.

The light source apparatus according to the present exemplary embodiment includes a light source 1, a collimator lens 2, a fluorescent body 9, and a light source optical system. The light source optical system referred to herein relates to a micro lens array 63, the dichroic mirror 7 (light guide element), the condenser lens unit 8 (condense optical system), and a light guide optical system. The light guide optical system referrers to a parabola mirror array 3 including a plurality of mirrors each having paraboloid having a curvature radius and a vertex coordinate that are different from one another, flat mirrors 4, and a concave lens 5.

(Light Path from Light Source 1 to Illumination Optical System)

The light source 1 is a laser diode (LD) emitting blue color light. The light flux emitted from the light source 1 is a diverged light flux, and as many collimator lenses 2 as the light sources 1 are provided in the advancing direction of the light flux from the light source 1. A collimator lens 2 is a positive lens making the diverged light flux from the light source 1 into a parallel light flux.

A plurality of light fluxes having been emitted from the collimator lenses 2 advances in the Z axis direction, and thereafter, travels to the flat mirrors 4 while the distances therebetween are reduced by the parabola mirror array 3. The light fluxes reflected by the flat mirrors 4 are incident upon the concave lens 5. The concave lens 5 sharing its focal position with the focal point of the parabola mirror array 3 emits light fluxes as parallel light fluxes.

The parallel light fluxes emitted from the concave lens 5 are incident upon a first lens surface array 61 which is one of the surfaces of the micro lens array 63 and at the side of the concave lens 5, and are incident upon a second lens surface array 62 while being split into a plurality of light fluxes. More specifically, the second lens surface array 62 is provided at the position to receive the light fluxes from the first lens surface array 61.

The split light fluxes emitted from the second lens surface array 62 are reflected by the dichroic mirror 7 and travels to the condenser lens unit 8. The dichroic mirror 7 has the minimum size required for reflecting the light fluxes from the second lens surface array 62, and has surface coated with a dielectric multilayered film (dichroic film) that reflects the blue color light from the light source 1 but allows light having a fluorescent light wavelength (described below) to transmit therethrough.

(Configuration of Dichroic Mirror 7)

The detailed configuration of the dichroic mirror 7 is as illustrated in FIGS. 2A and 2B. The dichroic mirror 7 illustrated in FIG. 1 has the configuration of FIG. 2A. More specifically, the dichroic mirror 7 has a configuration in which transmission surfaces 72 transmitting any light regardless of its wavelength are provided at the right and left in the y axis direction of the dichroic surface 71, which is light guide surface that reflects the blue color light from the light source 1 and allows the fluorescent light including the green color light and the red color light to transmit therethrough.

It should be noted that the dichroic mirror 7 is not limited to the configuration as illustrated in FIG. 2A. For example, as illustrated in FIG. 2B, the dichroic mirror 7 may have such a configuration that the transmission surface 72 is provided around the dichroic surface 71. Furthermore, at least one side of the dichroic surface 71 may be configured to overlap a certain side of the transmission surface 72, and the transmission surface 72 may be either a surface on the transparent substrate, or an anti-reflection coated surface.

In a case where the normal of the dichroic surface 71 is not included in the cross section parallel to the normal of the dichroic surface 71 and including the optical axis of the condenser lens unit 8, a width $D_d$ (described below) just needs to be defined in a surface on which the dichroic surface 71 is projected vertically in this cross section.

The split light fluxes reflected by the dichroic mirror 7 are condensed and overlapped on the fluorescent body 9 by the condenser lens unit 8 having a positive power. As a result, a light source spot is formed on the fluorescent body 9. The light source spot formed on the fluorescent body 9 is conjugate to each lens cell (lens surface) of the first lens surface array 61, so that the light source spot has a rectangular uniform distribution.

(Configuration for Suppressing Reduction in Light Conversion Efficiency of Fluorescent Body 9)

A description is given of the reason why the reduction in the light conversion efficiency of the fluorescent body 9 can be suppressed by providing the micro lens array 63 with reference to FIG. 3.

FIG. 3 is a diagram illustrating, in a simplified manner, an optical relationship of the first lens surface array 61, the second lens surface array 62, the condenser lens unit 8, and the fluorescent body 9 as illustrated in FIG. 1. The first lens surface array 61 corresponds to a first lens surface array 61', the second lens surface array 62 corresponds to a second lens surface array 62', the condenser lens unit 8 corresponds to a condenser lens unit 8', and the fluorescent body 9 corresponds to a fluorescent body 9'.

The fluorescent body 9' is positioned so as to become substantially conjugate to each lens cell of the first lens surface array 61' with the second lens surface array 62' and the condenser lens unit 8'. The first lens surface array 61' and the surface of the fluorescent body 9' are in an image-forming relationship. Accordingly, a light source image corresponding to a light distribution formed on each lens cell of the first lens surface array 61' is formed on the fluorescent body 9'. The size of the light source image is determined based on a pitch of a lens cell (a width of a lens cell) and a magnification of an image forming system. Furthermore, the light source image formed on each lens cell is disposed to overlap with each other on the fluorescent body 9' via the condenser lens unit 8'.

As illustrated at the left side of FIG. 3, even in a case where the light fluxes incident upon the first lens surface array 61' have a non-uniform luminance distribution, the light distribution formed on each lens cell is averaged according to the number of lens cells for the above reason. As a result, a light source image having a uniform distribution can be formed on the surface of the fluorescent body 9' as illustrated at the right side of FIG. 3.

Referring back to explanation about FIG. 1, at the time when the light fluxes made into parallel light by the concave lens 5 are incident upon the first lens surface array 61, they make a discrete light distribution in which the light fluxes from the light sources 1 are separated from each other with an interval. However, through splitting and overlapping via the above paths, a light source image having a uniform light distribution in a shape similar to each lens cell shape of the first lens surface array 61 is formed on the fluorescent body 9. In this manner, the light fluxes from the light sources 1 are less likely to be concentrated on a single spot on the fluorescent body 9, and a reduction in the light emission efficiency due to luminance saturation phenomenon can be suppressed.

(Configuration for Realizing Reduction in Size)

The blue color light emitted from the light source 1 and incident upon the fluorescent body 9 is converted into a fluorescent light mainly including a spectrum of red color light and green color light (conversion light). The fluorescent body 9 is formed by applying a fluorescent body layer onto an aluminum substrate having a high reflectance, and the aluminum substrate reflects a fluorescent light subjected to fluorescence conversion from the blue color light toward the condenser lens unit 8. The aluminum substrate reflects a part of the blue color light with the same wavelength without being fluorescence-converted.

As described above, the white color light flux including the fluorescent light including red color light and green color light and the unconverted blue color light is emitted from the fluorescent body 9, and condensed and made into parallel light by the condenser lens unit 8. The resultant light travels to an illumination optical system (not illustrated).

At this time, a case will be considered in which the width of the dichroic mirror 7, more specifically the width of the dichroic surface 71, is sufficiently larger than the light flux diameter of the white color light flux from the condenser lens unit 8. In such a case, the blue color light in the white color light flux passing through the dichroic surface 71 is reflected by the dichroic surface 71 and returns to the side of the light source 1. The blue color light thus cannot propagate to the illumination optical system.

More specifically, as the width of the dichroic surface 71 becomes larger, attenuation of the blue color light increases. As means for solving such attenuation of the blue color light, a configuration having a blue color light source provided separately from the light source 1 emitting excitation light may be considered as discussed in United States Patent Application Publication No. 2012/0133904, but this configuration increases the size of the entire apparatus. Accordingly, to minimize the attenuated blue color light, minimizing the area of the dichroic mirror 7 is considered in the present exemplary embodiment.

More specifically, in the present exemplary embodiment, the width $D_d$ of the dichroic surface 71 and the width $D_c$ of the condenser lens unit 8 are configured to satisfy the following condition. Namely, the width $D_d$ of the dichroic surface 71 is narrower than the width $D_c$ of the condenser lens unit 8 in a direction perpendicular to the optical axis of the condenser lens unit 8 (Z axis direction) in a cross section parallel to the normal of the dichroic mirror 7 and including the optical axis of the condenser lens unit 8 (XZ cross section).

In such a configuration, the blue color light which is in the white color light flux from the condenser lens unit 8 and which is included in the light flux passing through the dichroic surface 71 returns to the side of the light source 1, but the light flux not passing through the dichroic mirror 7 is guided to the illumination optical system without change. In other words, even in a case where a blue color light source is not provided separately from the light source for the excitation light and an optical system around the blue color light source is not provided, the white color light flux can be guided to the illumination optical system, so that a smaller light source optical system can be realized.

In a case where the dichroic mirror 7 has the configuration as illustrated in FIG. 2A, the width of the dichroic mirror 7 in the Z axis direction may be defined as $D_d$. On the other hand, in a case of a configuration including the transmission surface 72 other than the dichroic surface 71 in the XZ cross section as illustrated in the configuration of FIG. 2B, the width of the dichroic surface 71 in the Z axis direction may be defined as $D_d$.

(Definition of Light Flux Diameter)

The width Dd being narrower than the width Dc can be paraphrased as follows: a light flux diameter $D_{LD}$ of the excitation light emitted from the micro lens array 63 is made smaller than the light flux diameter $D_{phos}$ of the white color light flux from the condenser lens unit 8 by using the light flux diameter. The definition of the light flux diameter referred to herein will be described with reference to FIGS. 4A and 4B.

FIG. 4A illustrates a luminance cross section diagram of a light source image of excitation light formed on the second lens surface array 62. As described above, the light fluxes split on the first lens surface array 61 are condensed on the second lens surface array 62, and an image of a light emission point of an LD is formed at the condensing point. Accordingly, the luminance cross section diagram illustrated in FIG. 4A has a discrete distribution in which luminance peaks as many as the number corresponding to the lens cell pitch of the first lens surface array 61 are arranged. In this case, the light flux diameter $D_{LD}$ of the excitation light from the micro lens array 63 is a half width at half maximum of an envelope E of the luminance cross section, i.e., a width where a luminance of ½ of the maximum luminance I is obtained.

Figure 4B:
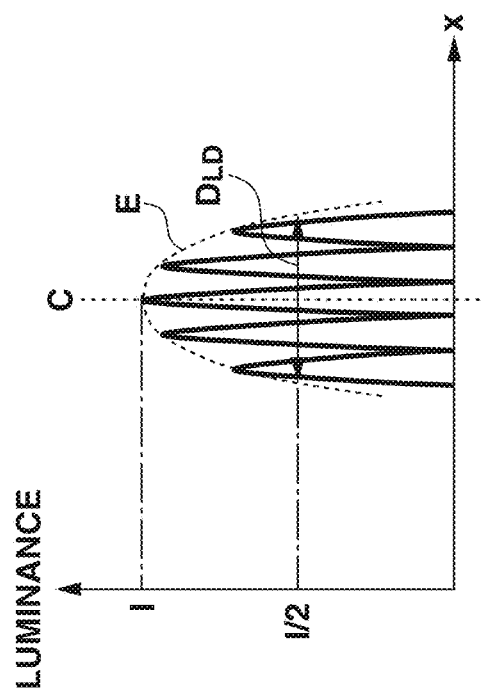

On the other hand, FIG. 4B illustrates a luminance cross section diagram of a light distribution of a white color light flux from the condenser lens unit 8. While the fluorescent light from the fluorescent body 9 is emitted in all directions, the surface of the fluorescent body 9 performs surface-emission, and therefore, this can also be understood as a perfect diffusion surface light source. Accordingly, in the luminance cross section of the fluorescence light flux, the luminance is the highest near the optical axis, and the luminance decreases with an increase in distance from the optical axis according to the cosine of the acceptance angle of the fluorescent light by the condenser lens unit 8, but the luminance becomes zero at the limiting point of the acceptance angle that is determined by the effective diameter of the condenser lens. In this case, the light flux diameter of the fluorescent light, i.e., the light flux diameter $D_{phos}$ of the white color light flux from the condenser lens unit 8, corresponds to a width at the position where the luminance is zero.

As described above, according to the configuration of the present exemplary embodiment, the reduction in the size of the light source apparatus can be achieved while the reduction in the light conversion efficiency of the fluorescent body is suppressed.

(Problems Associated with Reduction in Size of Light Flux Diameter of Excitation Light)

Now, a further reduction in the area of the dichroic mirror 7 to suppress the attenuation of the blue color light caused by the large size of the dichroic mirror 7 described above will be considered. In a case where the area of the dichroic mirror 7 is further reduced, it is necessary to further reduce the light flux diameter of the excitation light emitted from the second lens surface array 62. However, in a case where the light flux diameter of the excitation light is further reduced, the following problem arises. Hereinafter, the problem will be described with reference to FIGS. 5A and 5B and FIG. 6.

Figure 5A:
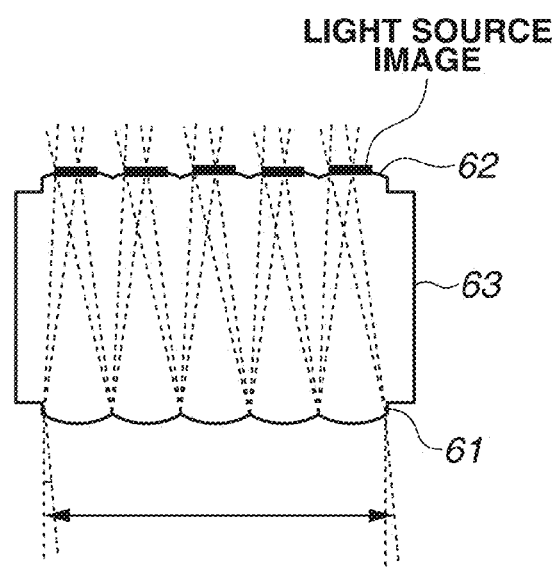
FIGS. 5A and 5B are diagrams each illustrating a relationship between a lens array and a light source image used in the first exemplary embodiment of the present invention.
Figure 5B:
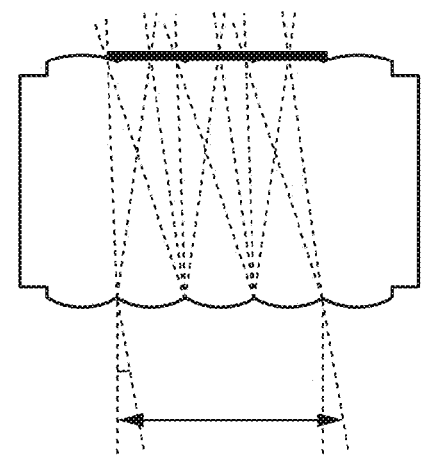

FIGS. 5A and 5B illustrate the first and second lens surface arrays 61, 62 according to the present exemplary embodiment in an enlarged scale. As illustrated in FIG. 5A, the parallel light fluxes split by the first lens surface array 61 each are condensed on the corresponding lens cell of the second lens surface array 62 by each lens cell of the first lens surface array 61. As a result, the light source image of the light source 1 is formed on each lens cell of the second lens surface array 62.

If the size of the light source image is larger than the pitch of the lens cell, a part of the light flux may be incident upon a lens cell adjacent to the corresponding lens cell. Such a component forms an image at a position adjacent to a position of a predetermined light source spot on the fluorescent body 9, and such a component is rejected by an optical element in an illumination optical system disposed at a latter stage, resulting in a light that is not effectively used, i.e., a loss. As a result, the light use efficiency is reduced.

FIG. 5B illustrates a case where the light flux diameter of the excitation light is reduced to reduce the area of the dichroic mirror 7 described above. In FIG. 5B, the light source image formed on each lens cell of the second lens surface array 62 is larger than the size of the lens cell, so that a light flux is incident upon a lens cell adjacent to the corresponding lens cell described above, which further reduces the light use efficiency. This is because the angle variation as the parallel light flux of the excitation light flux increases with reduction of the light flux diameter of the excitation light incident upon the first lens surface array 61.

(Angle Variation of Light Flux Diameter of Excitation Light)

The principle thereof will be described with reference to FIG. 6. FIG. 6 is a diagram illustrating a simplified optical relationship among optical elements from the light source 1 to the concave lens 5. A light source 1' corresponds to the light source 1. Mirrors 2' and 3' are elements having positive powers and each correspond to a mirror of the collimator lens 2 and the parabola mirror array 3, respectively. A concave lens 5' is an element having a negative power, and is the concave lens 5 as illustrated.

As described above, the parabola mirror array 3 and the concave lens 5 share the focal point, and form an afocal system. Accordingly, the elements 3' and 5' corresponding thereto also form an afocal system A. The light emitted from the light source 1' made into parallel light by the collimator lens 2' to be incident upon the afocal system A, and the light flux is compressed at a predetermined magnification.

At this time, when the light emission point of the light source 1' is infinitely small, the light emitted from the light source 1' is completely made into parallel light by the collimator lens 2', but the light emission point of the LD has a finite size, and accordingly, it is made into a parallel light flux having an angle variation $\theta_1$ corresponding to the size thereof. The angle variation $\theta_1$ is expressed as $\theta = a \tan(L/f_{coll})$ using a focal length $f_{coll}$ of the collimator lens 2' and a size L of the light emission point.

As described above, the parallel light flux incident upon the afocal system A has an angle variation $\theta_1$ corresponding to the finite size of the light emission point, but when the parallel light is incident upon the afocal system A and the light flux diameter changes, the angle variation changes to $\theta_2$. Now, let $D_1$ and $D_2$ be the diameters of the parallel light fluxes before and after being incident upon the afocal system A, the following formula holds from the relationship of an angular magnification.

Here, γ denotes the angular magnification. Further reducing the light flux diameter of the excitation light incident upon the first lens surface array 61 described above is equivalent to further reducing the light flux diameter $D_2$ emitted from the afocal system A. When the light flux diameter D2 is reduced, the angular magnification γ increases, and accordingly, the numerical value of the left term increases, and as a result, $\theta_2$ increases.

Accordingly, when the diameter of the light flux emitted from the afocal system is reduced, the angle variation $\theta_2$ increases, and in the latter stage thereof, the angle variation $\theta_2$ of the parallel light flux incident upon the first lens surface array 61 also increases. Then, as illustrated in FIG. 5B, the size of the light source image on the second lens surface array 62 increases. More specifically, in a case where the light flux diameter of the excitation light is reduced excessively by reducing the area of the dichroic mirror for the purpose of suppressing the attenuation of the blue color light, the size of the light source image formed on the second lens surface array 62 becomes larger than the pitch of the lens cell, and the light use efficiency decreases, which is not desirable.

To that end, a reduction in the size of the light source spot formed on the fluorescent body 9 will be considered. This means a reduction in the pitch of the lens cell of the first lens surface array 61 in the image-forming relationship with the fluorescent body 9. When the pitch of the lens cell of the second lens surface array 62 is also reduced according to the reduction in the pitch of the lens cell of the first lens surface array 61, the size of the light source image relatively increases with respect to the size of the lens cell. As a result, the light use efficiency decreases, which is not desirable as in the aforementioned case.

(More Preferable Mode)

To obtain the configuration according to the present exemplary embodiment while suppressing such loss, it is desirable that the light flux diameter of the excitation light path and the size of the light source spot on the fluorescent body 9 satisfy the following condition. In the following description, a value obtained by dividing the focal length $f_c$ of the condenser lens unit 8 by the light flux diameter is adopted as an F number, and the F number is substituted for the light flux diameter. The reason for this is as follows.

The focal length of the condenser lens unit 8 according to the present exemplary embodiment is $f_c$=15 mm, but the focal length of the condenser lens unit 8 has a flexibility in design. Thus, in a case where the effective diameter of each optical element in the illumination optical system is large, the focal length is increased in proportion thereto, and the light flux diameter of the fluorescent light may be increased while the acceptance angle is maintained. In this case, the light flux diameter of the excitation light also changes in proportion to the focal length of the condenser lens, but the light flux diameter can be generalized by dividing each light flux diameter by the focal length of the condenser lens, which is desirable in terms of calculation.

When the light flux diameter of the white color light flux from the condenser lens unit 8 according to the present exemplary embodiment is $D_{phos}$=30 mm, the F number to satisfy $f_c$=15 mm is as follows.

$$\frac{\tan\theta_2}{\tan\theta_1} = \frac{D_1}{D_2} \, (=\gamma) \quad \text{Expression (1)}$$

$$F = \frac{f_c}{D_{phos}} = 0.5 \quad \text{Expression (2)}$$

Meanwhile, when the light flux diameter of the excitation light from the micro lens array 63 is $D_{LD}=15$ mm, the F number is as follows.

$$F = \frac{f_c}{D_{LD}} = 1.0 \qquad \text{Expression (3)}$$

Figure 7A:
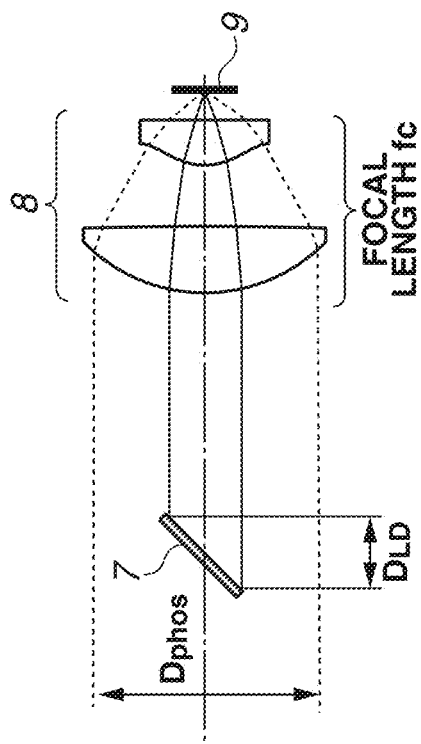
FIGS. 7A and 7B are diagrams illustrating a relationship between F numbers of an excitation light path and a fluorescent light path.

In other words, according to the present exemplary embodiment, the F number of the excitation light path, i.e., a light path in which the excitation light is condensed on the fluorescent body 9, is larger than the F number of the fluorescent light path, i.e., a light path in which the fluorescent light is condensed by the condenser lens unit 8 as illustrated in FIG. 7A.

Figure 7B:
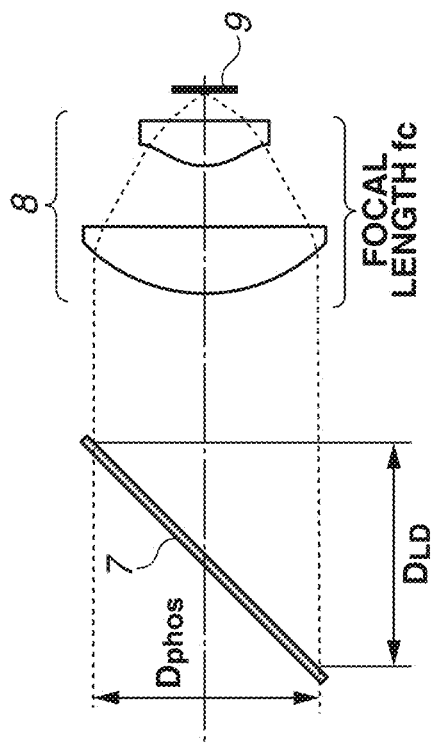

For example, a case where the F number of the fluorescent light path and the F number of the excitation light path are substantially the same will be considered. In this case, as illustrated in FIG. 7B, all or most of the unconverted light from the condenser lens unit 8 is reflected by the dichroic mirror 7 without being guided to the illumination optical system, and accordingly, the loss increases, which is not desirable. Therefore, it is desirable that the relationship illustrated in FIG. 7A is satisfied.

More desirably, when the F number of the fluorescent light path defined in the conditional expression (2) is defined as $F_{phos}$, and the F number of the excitation light path defined in the conditional expression (3) is denoted as $F_{LD}$, the light source optical system can satisfy the following expression.

$$0.4 < \frac{F_{phos}}{F_{LD}} < 0.6 \qquad \text{Expression (4)}$$

In a case where the lower limit value is less than that of the conditional expression (4), the F number $F_{LD}$ of the excitation light path increases. In other words, the light flux diameter $D_{LD}$ of the excitation light is reduced. When the light flux diameter $D_{LD}$ of the excitation light is reduced excessively, the size of the light source image formed on the second lens surface array described above becomes larger than the pitch of the lens cell, and accordingly the light use efficiency decreases, which is not desirable.

On the other hand, in a case where the upper limit value is greater than that of the conditional expression (4), the F number $F_{phos}$ of the fluorescent light path and the F number $F_{LD}$ of the excitation light path are closer to each other. In this case, the loss increases as illustrated in FIG. 7B, which is not desirable.

In the present exemplary embodiment, eight LDs are made into a unit, and totally four units are used, i.e., totally 32 LDs are used as a light source, and the light source spot formed on the fluorescent body 9 is in a substantially square shape, one side of which is about 1.0 to 1.5 mm. This is because when the light density of the light source spot on the fluorescent body 9 as described above increases, the light conversion efficiency is reduced due to the luminance saturation phenomenon, or the fluorescent body 9 is degraded in a shorter period of time.

For example, in case where the light source image on the fluorescent body 9 is reduced, i.e., in a case where the pitch of the lens array is further reduced, the size of the light source image formed on the lens cell does not change, and the external shape of the corresponding lens cell becomes relatively smaller. As a result, the reduction in the light use efficiency occurs as described above, which is not desirable.

In a case where the F number of the excitation light path is defined as $F_{LD}$, and the length of one side of the light source spot is defined as $d_{phos}$ in view of the above relationship, it is desirable that the light source optical system satisfies the following conditional expression.

$$1.0 < \left\{\left(\frac{1}{F_{LD}}\right) \cdot d_{phos}\right\}^2 \ [\text{mm}^2] \qquad \text{Expression (5)}$$

The conditional expression (5) means that in a case where the F number $F_{LD}$ of the excitation light path is 1.0 as in the case of the present exemplary embodiment, it is desirable that the area of the light source spot is larger than 1.0 mm². This is because problems occur, e.g., a reduction in the light conversion efficiency due to the increase in the light density of the light source spot on the fluorescent body 9 as described above.

Furthermore, the conditional expression (5) means that in a case where the area of the light source spot is larger than 1.0 mm², the F number $F_{LD}$ of the excitation light path increases, i.e., the light flux diameter $D_{LD}$ of the excitation light is reduced. With this configuration, the area of the dichroic mirror 7 is reduced, so that more unconverted light can be guided from the condenser lens unit 8 to the illumination optical system.

However, in a case where the light flux diameter $D_{LD}$ of the excitation light is excessively reduced, i.e., when the F number $F_{LD}$ the excitation light path excessively increases, the lower limit value is less than that of the conditional expression (5). In a case where the light flux diameter $D_{LD}$ of the excitation light is excessively reduced, the size of the light source image formed on the second lens surface array 62 becomes larger than the pitch of the lens cell as described above, and accordingly, the light use efficiency decreases, which is not desirable.

However, in a case where the area of the light source spot is too large, the performance as the point light source is decreased. Furthermore, in a case where the F number $F_{LD}$ of the excitation light path is too small, i.e., when the light flux diameter $D_{LD}$ of the excitation light is too large, size of the dichroic mirror 7 increases, which makes it difficult to guide the unconverted light from the condenser lens unit 8 to the illumination optical system. Accordingly, it is further desirable the light source optical system can satisfy the following conditional expression.

$$1.0 < \left\{\left(\frac{1}{F_{LD}}\right) \cdot d_{phos}\right\}^2 < 4.0 \ [\text{mm}^2] \qquad \text{Expression (5a)}$$

(Modification of Conditional Expression)

Here, the right-hand side of the conditional expression (5) is further simplified. The area of the light source spot can be expressed using a cell pitch $d_{LA}$ of a lens cell, a focal length $f_{LA}$ of the lens cell, and a focal length $f_c$ of the condenser lens unit 8, and the right-hand side of the conditional expression (5) can be converted as follows.

$$\left\{\left(\frac{1}{F}\right) \cdot d_{phos}\right\}^2 = \left\{\left(\frac{D_{LD}}{f_c}\right) \cdot \left(\frac{f_c}{f_{LA}} d_{LA}\right)\right\}^2 = \left(\frac{D_{LD} d_{LA}}{f_{LA}}\right)^2 \qquad \text{Expression (6)}$$

Here, the square of the light flux diameter $D_{LD}$ of the excitation light and the pitch $d_{LA}$ of the lens cell at the right term of the expression (6) is replaced with a cross section area $S_{LD}$ of an excitation light flux and an area $S_{LA}$ of the lens cell as in the expression (7).

$$\left(\frac{D_{LD}d_{LA}}{f_{LA}}\right)^2 \rightarrow S_{LD}\frac{S_{LA}}{f_{LA}^2} \qquad \text{Expression (7)}$$

Furthermore, the cross section area $S_{LD}$ of the excitation light flux can be transformed as in the expression (8) by using the total number of cells N of the lens cell and the area $S_{LA}$ of the lens cell.

$$S_{LD}\frac{S_{LA}}{f_{LA}^2} \rightarrow N \cdot S_{LA} \cdot \frac{S_{LA}}{f_{LA}^2} \qquad \text{Expression (8)}$$

Finally, the conditional expression (5) can be simplified only into the parameter of the lens cell as in the following conditional expression (9).

$$1.0 < N \cdot S_{LA} \cdot \frac{S_{LA}}{f_{LA}^2} \ [\text{mm}^2] \qquad \text{Expression (9)}$$

In the present exemplary embodiment, the conditional expression (5) or (9) is satisfied, so that the size of the light source spot and the F number $F_{LD}$ of the excitation light, i.e., the light flux diameter $D_{LD}$ of the excitation light, are set to an appropriate relationship. With this configuration, while the effect of the light density of the light source spot on the fluorescent body 9 is suppressed, the increase in the size of the dichroic mirror 7 is suppressed, so that more unconverted light can be guided from the condenser lens unit 8 to the illumination optical system. Furthermore, this configuration can suppress the reduction in the light use efficiency, which is caused by the light source image on the second lens surface array 62 increasing because of the light flux diameter $D_{LD}$ of the excitation light being excessively reduced.

It is to be understood that it is more desirable that the light source optical system satisfies the following expression, as in the case of the conditional expression (5).

$$1.0 < N \cdot S_{LA} \cdot \frac{S_{LA}}{f_{LA}^2} < 4.0 \ [\text{mm}^2] \qquad \text{Expression (9a)}$$

(Case of Fewer LDs)

In the present exemplary embodiment, 32 LDs are used in total as described above, but fewer LDs may be used. In a case where eight LDs are made into a unit, and one unit (eight LDs in total) is used, the term of SLD in the expressions (7) and (8) can be reduced to ¼, and therefore, the lower limit value of the conditional expression (9) can be alleviated as follows.

$$0.25 < N \cdot S_{LA} \cdot \frac{S_{LA}}{f_{LA}^2} \ [\text{mm}^2] \qquad \text{Expression (10)}$$

More specifically, in a case where more LDs are used to increase the brightness, it is desirable that the expression (9) is satisfied, but in a case where the number of LDs is small, at least the expression (10) should be satisfied. Accordingly, while this configuration can suppress the occurrence of the loss that is caused when the light source image becomes larger with respect to the size of the lens cell, the reduction in the light conversion efficiency of the wavelength conversion element can be suppressed, and smaller light source optical system can be realized.

Furthermore, as in the conditional expression (5a) described above, it is desirable that the following expression is satisfied to suppress the effect that is caused when the light source spot becomes larger.

$$0.25 < N \cdot S_{LA} \cdot \frac{S_{LA}}{f_{LA}^2} < 10 \ [\text{mm}^2] \qquad \text{Expression (10a)}$$

Furthermore, is more desirable that the following expression can be satisfied.

$$0.25 < N \cdot S_{LA} \cdot \frac{S_{LA}}{f_{LA}^2} < 7.0 \ [\text{mm}^2] \qquad \text{Expression (10b)}$$

As in the conditional expression (5a), the upper limit value of the conditional expression (10) may be set to 4.0.

Numerical Examples according to the present invention are as follows.

TABLE 1

| Numerical Examples | $f_c$ [mm] | $D_{LD}$ [mm] | $F_{LD}$ | $D_{phos}$ [mm] | $F_{phos}$ | $F_{phos}/F_{LD}$ | $d_{phos}$ [mm] | N | $S_{LA}$ [mm²] | $f_{LA}$ [mm] | Calculation results in conditional expression (10) [mm²] |
|---|---|---|---|---|---|---|---|---|---|---|---|
| 1 | 15.0 | 15.0 | 1.0 | 30.0 | 0.5 | 0.5 | 1.1 | 961 | 0.23 | 6.5 | 1.21 |
| 2 | 15.0 | 15.0 | 1.0 | 30.0 | 0.5 | 0.5 | 1.5 | 529 | 0.42 | 6.5 | 2.24 |
| 3 | 15.0 | 15.0 | 1.0 | 30.0 | 0.5 | 0.5 | 1.0 | 1156 | 0.19 | 6.5 | 1.03 |
| 4 | 15.0 | 15.0 | 1.0 | 30.0 | 0.5 | 0.5 | 2.0 | 289 | 0.76 | 6.5 | 3.92 |
| 5 | 15.0 | 15.0 | 1.0 | 30.0 | 0.5 | 0.5 | 0.5 | 4624 | 0.05 | 6.5 | 0.26 |
| 6 | 15.0 | 29.0 | 0.5 | 30.0 | 0.5 | 1.0 | 1.0 | 4225 | 0.19 | 6.5 | 3.75 |
| 7 | 15.0 | 7.5 | 2.0 | 30.0 | 0.5 | 0.3 | 1.0 | 289 | 0.19 | 6.5 | 0.26 |

Figure 8:
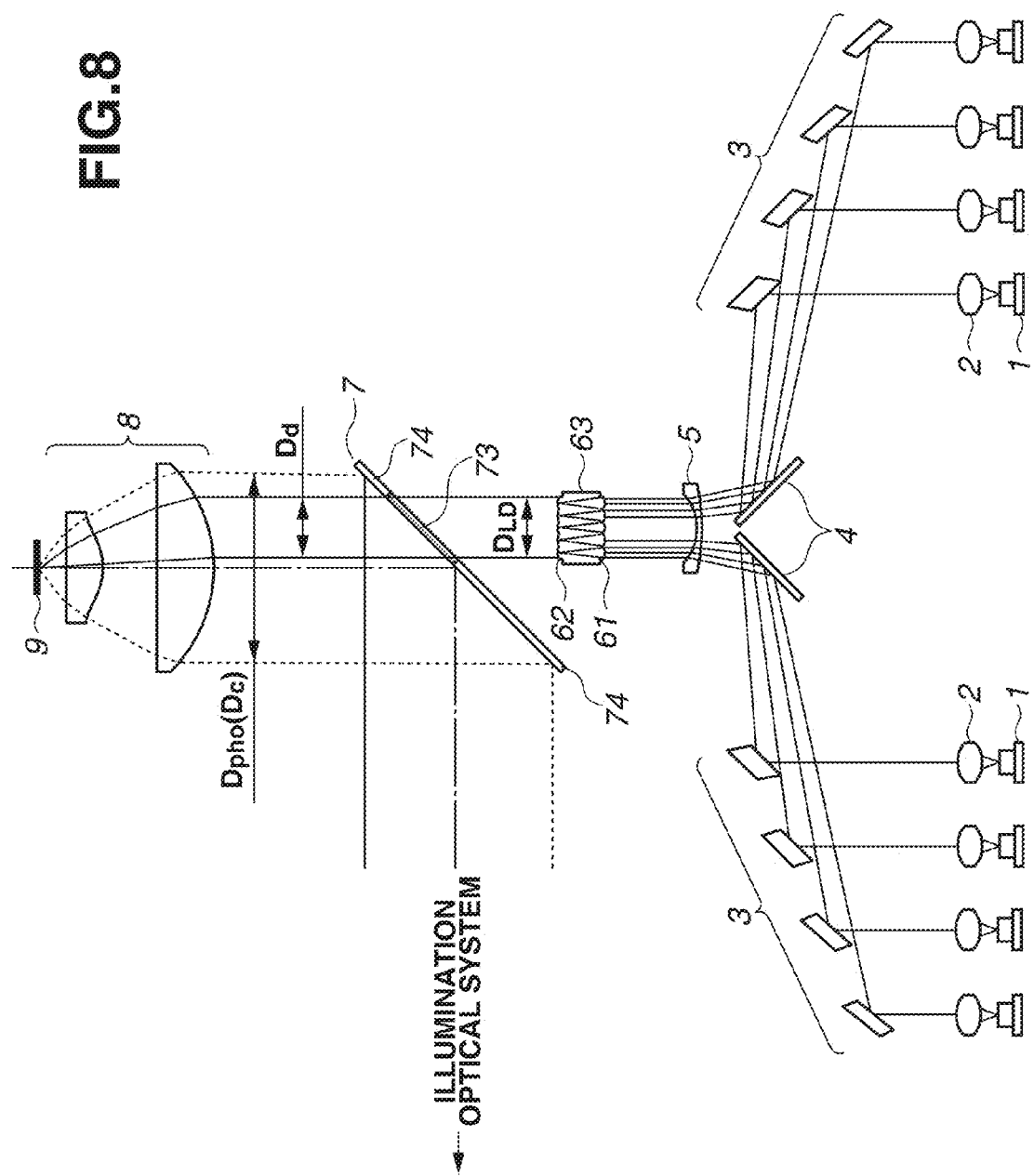
FIG. 8 is a diagram illustrating a configuration of a light source apparatus according to a second exemplary embodiment of the present invention.

A second exemplary embodiment of the present invention will be described below. FIG. 8 is a diagram illustrating a configuration of a light source apparatus according to the present exemplary embodiment. The difference between the first exemplary embodiment described above and the present exemplary embodiment lies in the configuration of the dichroic mirror 7 and the position relationship of the condenser lens unit 8 and the fluorescent body 9 with respect to the dichroic mirror 7.

The dichroic mirror 7 according to the first exemplary embodiment described above is configured to include the dichroic surface 71 having characteristics that reflects the excitation light from the light source 1 and allows the fluorescent light from the fluorescent body 9 to transmit therethrough and the transmission surface 72 allowing the light to transmit therethrough regardless of the wavelength.

By contrast, a dichroic mirror 7 according to the present exemplary embodiment is configured to include a dichroic surface 73 having characteristics that allows excitation light from a light source 1 to transmit therethrough and reflects fluorescent light from a fluorescent body 9 and a reflection surface 74 reflecting light regardless of the wavelength. In a case where the dichroic mirror 7 having such a configuration is used, the dichroic mirror 7, condenser lens unit 8, and the fluorescent body 9 need to be arranged in the direction in which the light flux from the light source 1 travels.

Even in such a configuration, the white color light flux can be guided to the illumination optical system even if a blue color light source is not provided separately from the light source for excitation light, and a small light source optical system can be realized. Furthermore, the reduction in the light conversion efficiency of the fluorescent body 9 can be suppressed by the micro lens array 63.

Figure 9:
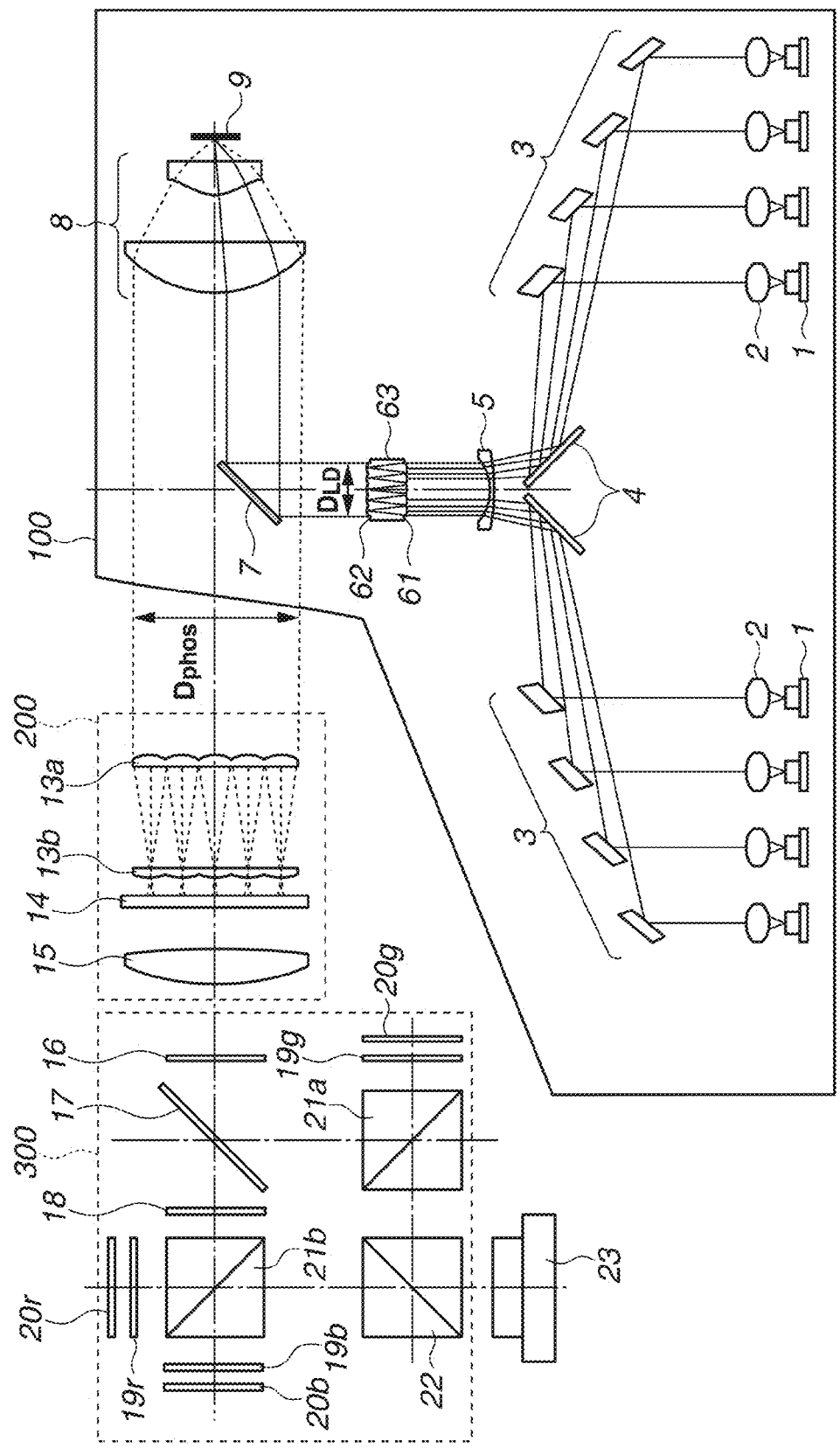
FIG. 9 is a diagram illustrating a configuration of a projector on which a light source apparatus according to each exemplary embodiment of the present invention can be mounted.

A third exemplary embodiment of the present invention will be described below. FIG. 9 is a diagram illustrating a configuration of a projector (projection display apparatus) having the light source optical system and the light source apparatus according to the first exemplary embodiment.

FIG. 9 illustrates a light source apparatus 100 according to the first exemplary embodiment. The light source apparatus according to the second exemplary embodiment may be used as the light source apparatus 100 in FIG. 9.

An illumination optical system 200 illuminates a liquid crystal panel 20 (optical modulation element) described below by using a light flux from the light source apparatus 100. The illumination optical system 200 includes a third fly-eye lens 13a, a fourth fly-eye lens 13b, a polarization conversion element 14, and a condenser lens 15.

The light flux from the light source apparatus 100 is split into a plurality of light fluxes by the third fly-eye lens 13a, and forms a light source image between the fourth fly-eye lens 13b and the polarization conversion element 14. The polarization conversion element 14 is configured to align the polarization direction of the incident light flux in a predetermined direction, and the light flux from the polarization conversion element 14 is guided by the condenser lens 15 to a color separating/combining unit 300.

The color separating combining unit 300 includes a polarization plate 16, a dichroic mirror 17, a wavelength selectivity phase difference plate 18, a red color liquid crystal panel 20r, a green color liquid crystal panel 20g, and a blue color liquid crystal panel 20b. The liquid crystal panels 20r, 20g, 20b are collectively referred to as a liquid crystal panel 20. Furthermore, the color separating/combining unit 300 includes a red color λ/4 plate 19r, a green color λ/4 plate 19g, a blue color λ/4 plate 19b, a first polarization beam splitter 21a, a second polarization beam splitter 21b, and a combining prism 22. The red color λ/4 plate 19r, the green color λ/4 plate 19g, and the blue color λ/4 plate 19b are collectively referred to as a λ/4 plate 19. A portion of the color separating/combining unit 300 except for the liquid crystal panel 20 is referred to as a color separating and combining system.

The polarization plate 16 is a polarization plate that allows only the light in the polarization direction aligned by the polarization conversion element 14 to transmit therethrough, and the blue color light and the red color light in the light from the polarization plate 16 is guided by the dichroic mirror 17 toward the second polarization beam splitter 21b. The green color light is guided toward the first polarization beam splitter 21a.

The first polarization beam splitter 21a and the second polarization beam splitter 21b are configured to guide the light from the dichroic mirror 17 to the liquid crystal panel 20 according to the polarization direction, and guide the light from the liquid crystal panel 20 to the combining prism 22. The λ/4 plate 19 gives a phase difference of λ/2 in the reciprocation made by the reflection at the liquid crystal panel 20, so that the λ/4 plate 19 has an effect of enhancing the analysis effect.

The combining prism 22 combines the blue color light and the red color light from the second polarization beam splitter 21b and the green color light from the first polarization beam splitter 21a, and guides the combined light to a projection optical system 23.

According to such a configuration, the projector illustrated in FIG. 8 can project a color image onto a projection surface such as a screen.

Furthermore, a positional relationship of the light source apparatus 100, the illumination optical system 200, the color separating/combining unit 300, and the projection optical system 23 with one another may not be a relationship as illustrated in FIG. 8. More specifically, all of the optical axis of the condenser lens unit 8, the optical axis of the condenser lens 15, a surface normal of the liquid crystal panel 20, and the optical axis of the projection optical system 23 exist in the same plane in FIG. 8. However, each axis does not necessarily exist in the same plane, and may be changed as necessary so that the surface where they exist may be different depending on the axis by using a mirror and the like.

The exemplary embodiments of the present invention have been hereinabove described, but it is to be understood that the present invention is not limited to these exemplary embodiments, and various modifications and changes can be made within the gist thereof.

Other Embodiments

Each exemplary embodiment described above shows an example of a configuration in which the surface of the micro lens array 63 facing the concave lens 5 is the first lens surface array 61, and a surface of the micro lens array 63 facing the side of the dichroic mirror 7 is the second lens surface array 62. Such a configuration can be used to suppress a relative displacement between both the micro lens array 63 and the first lens surface array 61.

However, the present invention is not limited to the above configuration. Instead of the micro lens array 63, a first fly-eye lens having the first lens surface array 61 and a second fly-eye lens having the second lens surface array 62 may be provided in that order from the side of the concave lens 5. In this case, the volume during glass formation can be reduced, so that it takes less time to form the glass.

Although the details have not been described in each of the exemplary embodiments described above, the light source 1 and the collimator lens 2 may be held by separate holding members, or may be held by the same holding member. For example, an LD bank integrally including eight light sources 1 and collimator lenses 2 may be used.

The light flux from the parabola mirror array 3 may be guided to the concave lens 5 by using a prism instead of the flat mirror 4 according to each of the above embodiments.

In each of the above exemplary embodiments described above, for example, a light source image formed on the second lens surface array 62 by the first lens surface array 61. However, the light source image should only be formed near the second lens surface array 62. In other words, the light source image may be formed between the second lens surface array 62 and the fluorescent body 9, or between the second lens surface array 62 and the dichroic mirror 7.

In each of the above exemplary embodiments described above, the configuration of the fluorescent body 9 made by applying a fluorescent body layer onto a high reflectance aluminum substrate has been illustrated as an example. More specifically, this may be a configuration in which a wheel made by continuously applying a fluorescent body in a peripheral direction on a circular aluminum substrate may be rotated with a motor. According to such a configuration, the position where the laser light from the light source 1 is condensed on the fluorescent body layer is changed, so that the degradation of the fluorescent body layer can be suppressed.

In each of the above exemplary embodiments described above, for example, the dichroic surface 71 is provided as the light guide surface, but the present invention is not limited to such a configuration. For example, the light fluxes from multiple light sources 1 may be aligned in the predetermined polarization direction, and instead of the dichroic surface 71, a polarization dividing surface may be provided as the light guide surface. The light fluxes from the fluorescent body 9 are emitted in such a state that the polarization directions are not organized, and accordingly, on the polarization dividing surface, a light flux having the same wavelength as the light flux from the light source 1 can also be guided to the illumination optical system.

While the present invention has been described with reference exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-232534, filed Nov. 28, 2015, which is hereby incorporated by reference herein in its entirety.

What is claimed is:

1. A light source optical system configured to guide a light flux from a light source to a wavelength conversion element, the light source optical system comprising:
   a first lens surface array including a plurality of first lens surfaces;
   a second lens surface array including a plurality of second lens surfaces and configured to receive a light flux from the first lens surface array;
   a condense optical system having a positive power and configured to guide a light flux from the second lens surface array to the wavelength conversion element; and
   a light guide surface configured to guide the light flux from the second lens surface array to the wavelength conversion element via the condense optical system,
   wherein in a direction orthogonal to an optical axis of the condense optical system in a cross section parallel to a normal of the light guide surface and including the optical axis of the condense optical system, a width of the light guide surface is narrower than a width of the condense optical system, and
   the following expression is satisfied:

$$0.25 < N \cdot S_{LA} \cdot \frac{S_{LA}}{f_{LA}^2} \ [\text{mm}^2],$$

where the number of the second lens surfaces is defined as N, a focal length of each of the respective second lens surfaces is defined as $f_{LA}$, and an area of each of the respective second lens surfaces is defined as $S_{LA}$.

2. The light source optical system according to claim 1, wherein in a case where a value obtained by dividing a focal length of the condense optical system by a light flux diameter of a light flux guided from the condense optical system to the light guide surface is adopted as an F number of a fluorescent light path, and a value obtained by dividing the focal length of the condense optical system by a light flux diameter of a light flux guided from the second lens surface array to the light guide surface is adopted as an F number of an excitation light path, the F number of the excitation light path is larger than the F number of the fluorescent light path.

3. The light source optical system according to claim 2, wherein the following expression is satisfied:

$$0.4 < \frac{F_{phos}}{F_{LD}} < 0.6,$$

where the F number of the fluorescent light path is defined as $F_{phos}$, and the F number of the excitation light path is defined as $F_{LD}$.

4. The light source optical system according to claim 1 further comprising:
   a light guide element including the light guide surface and a transmission surface configured to allow a light flux from the wavelength conversion element to transmit therethrough regardless of a wavelength,
   wherein the light guide surface is a dichroic surface configured to reflect a light flux from the light source and guide the light flux to the wavelength conversion element, and allow a light flux having a wavelength different from that of the light flux from the light source among the light flux from the wavelength conversion element to transmit therethrough in a direction different from the light source.

5. The light source optical system according to claim 1 further comprising:
   a light guide element including the light guide surface and a reflection surface configured to reflect a light flux from the wavelength conversion element regardless of a wavelength,
   wherein the light guide surface is a dichroic surface configured to allow the light flux from the light source to transmit therethrough and guide the light flux to the wavelength conversion element, and reflect and guide, in a direction different from the light source, a light flux having a wavelength different from that of the light flux from the light source among the light flux from the wavelength conversion element.

6. A projection display apparatus comprising:
a light source;
a positive lens provided in an advancing direction of a light flux from the light source;
a wavelength conversion element;
a light source optical system configured to guide the light flux from the light source to the wavelength conversion element;
an optical modulation element;
an illumination optical system configured to illuminate the optical modulation element by using a light flux from the light source optical system; and
a color separating and combining system configured to guide the light flux from the light source optical system to the optical modulation element, and guide a light flux from the optical modulation element to a projection optical system,
wherein the light source optical system includes:
a first lens surface array including a plurality of first lens surfaces;
a second lens surface array including a plurality of second lens surfaces and configured to receive a light flux from the first lens surface array;
a condense optical system having a positive power and configured to guide a light flux from the second lens surface array to the wavelength conversion element; and
a light guide surface configured to guide the light flux from the second lens surface array to the wavelength conversion element via the condense optical system,
wherein in a direction orthogonal to an optical axis of the condense optical system in a cross section parallel to a normal of the light guide surface and including the optical axis of the condense optical system, a width of the light guide surface is narrower than a width of the condense optical system, and
the following expression is satisfied:

$$0.25 < N \cdot S_{LA} \cdot \frac{S_{LA}}{f_{LA}^2} \ [\text{mm}^2],$$

where the number of the second lens surfaces is defined as N, a focal length of each of the respective second lens surfaces is defined as $f_{LA}$, and an area of each of the respective second lens surfaces is defined as $S_{LA}$.

7. The projection display apparatus according to claim 6, wherein in a case where a value obtained by dividing a focal length of the condense optical system by a light flux diameter of a light flux guided from the condense optical system to the light guide surface is adopted as an F number of a fluorescent light path, and a value obtained by dividing the focal length of the condense optical system by a light flux diameter of a light flux guided from the second lens surface array to the light guide surface is adopted as an F number of an excitation light path, the F number of the excitation light path is larger than the F number of the fluorescent light path.

8. The projection display apparatus according to claim 7, wherein the following expression is satisfied:

$$0.4 < \frac{F_{phos}}{F_{LD}} < 0.6,$$

where the F number of the fluorescent light path is defined as $F_{phos}$, and the F number of the excitation light path is defined as $F_{LD}$.

9. The projection display apparatus according to claim 6, further comprising:
a light guide element including the light guide surface and a transmission surface configured to allow a light flux from the wavelength conversion element to transmit therethrough regardless of a wavelength,
wherein the light guide surface is a dichroic surface configured to reflect a light flux from the light source and guide the light flux to the wavelength conversion element, and allow a light flux having a wavelength different from that of the light flux from the light source among the light flux from the wavelength conversion element to transmit therethrough in a direction different from the light source.

10. The projection display apparatus according to claim 6, further comprising:
a light guide element including the light guide surface and a reflection surface configured to reflect a light flux from the wavelength conversion element regardless of a wavelength,
wherein the light guide surface is a dichroic surface configured to allow the light flux from the light source to transmit therethrough and guide the light flux to the wavelength conversion element, and reflect and guide, in a direction different from the light source, a light flux having a wavelength different from that of the light flux from the light source among the light flux from the wavelength conversion element.

* * * * *